(12) United States Patent
Lai

(10) Patent No.: US 12,092,943 B2
(45) Date of Patent: Sep. 17, 2024

(54) LIGHT PANEL SWAPPING MECHANISM BETWEEN TOP AND SIDE SHOT PHOTOGRAPHY

(71) Applicant: Ortery Technologies, Inc., Irvine, CA (US)

(72) Inventor: Peng-Cheng Lai, Los Altos, CA (US)

(73) Assignee: Ortery Technologies, Inc., Irvine, CA (US)

( * ) Notice: Subject to any disclaimer, the term of this patent is extended or adjusted under 35 U.S.C. 154(b) by 239 days.

(21) Appl. No.: 17/893,271

(22) Filed: Aug. 23, 2022

(65) Prior Publication Data

US 2024/0069413 A1 Feb. 29, 2024

(51) Int. Cl.
  *G03B 15/02* (2021.01)
  *F21V 21/06* (2006.01)
  *F21V 21/14* (2006.01)
  *F21V 21/30* (2006.01)
  *G03B 15/07* (2021.01)

(52) U.S. Cl.
  CPC ............. *G03B 15/02* (2013.01); *F21V 21/06* (2013.01); *F21V 21/145* (2013.01); *F21V 21/30* (2013.01); *G03B 15/07* (2013.01)

(58) Field of Classification Search
  CPC .... G03B 15/06; G03B 15/07; G03B 2215/00; G03B 2215/0517; F21V 21/30; F21V 21/145; F21V 21/06
  See application file for complete search history.

(56) References Cited

FOREIGN PATENT DOCUMENTS

| CN | 209725952 U | * | 12/2019 | |
| CN | 115061329 A | * | 9/2022 | ............ G03B 15/02 |
| JP | 2004178908 A | * | 6/2004 | |
| KR | 19990064913 A | * | 8/1999 | ............ G03B 15/02 |
| KR | 20070006191 A | * | 1/2007 | ............ G03B 15/06 |

* cited by examiner

*Primary Examiner* — Christopher E Mahoney

(57) ABSTRACT

A light panel swapping mechanism between top and side shot photography capable of providing a pure color background for a photographed object captured by a photographic device includes a light panel, a light transmission cover plate, a light emitting module and a base. The light panel has an opening facing the photographic device and the photographed object, a rear surface opposite to the opening and a side surface located between the opening and the rear surface. The light transmission cover plate covers the opening and can be evenly lighted up by the light emitting module disposed in the light panel. The base is pivoted to the side or rear surface, so the light panel can be rotated relative to the base between a lying and an upright position. The photographed object can be put on the light transmission cover plate when the light panel is at the lying position.

18 Claims, 7 Drawing Sheets

LIGHT PANEL SWAPPING MECHANISM BETWEEN TOP AND SIDE SHOT PHOTOGRAPHY

FIELD OF THE INVENTION

The present invention relates to a light panel, and more particularly to a light panel swapping mechanism between top and side shot photography.

DESCRIPTION OF THE RELATED ART

With the rapid development of e-commerce, the demand for product photography to let the sellers have high quality pictures on their websites and electronic catalogues is increasing. The photographer can shoot the product from different angles of view to show various features on it, and the top shot and side shot shooting directions are commonly used. In addition, a pure color background is usually used during photography for ease of the post-processing and editing. It should be noted that the background is always right behind the product but merely used as a background during side shot photography and further carrying the product during top shot photography. In order to satisfy different photography requirements, various light boxes came out gradually, which not only can provide a pure white background but also automatically generating a transparent background.

To the apparel products, the photographer usually lets the clothes flat lay on a flat light panel for top shot photography, while dresses the clothes on a mannequin in front of a vertical light panel for side shot photography. It should be noted that the flat and vertical light panels for apparel product photography are not only often quite huge in order to provide a large enough pure color background but also not interchangeable. Therefore, to satisfy both of the demands of top shot and side shot photography, the users may need to buy these two kinds of light panels both, and that will cost a lot of money and take up a lot of space. Accordingly, it is desired to provide a new light panel to meet the needs of top shot and side shot both for apparel product photography.

SUMMARY OF THE INVENTION

The present invention is directed to a method to mark a rotation center of a spindle-less turntable, so as to help the users to easily put a photographed object onto a rotation center of a platter surface.

The present invention is directed to a light panel swapping mechanism between top and side shot photography, wherein the light panel can be rotated relative related to the base between a lying position and an upright position, so as to be not only a bottom light for top shot photography but also a back light for side shot photography.

The present invention provides a light panel swapping mechanism between top and side shot photography for providing a pure color background for a photographed object captured by a photographic device and comprising a light panel, a light transmission cover plate, a light emitting module and a base. The light panel has an opening facing toward the photographic device and the photographed object, a rear surface opposite to the opening and a side surface located between the opening and the rear surface. The light transmission cover plate covers the opening, and the light emitting module is disposed in the light panel and capable of evenly lighting up the light transmission cover plate. The base is pivoted to the side surface or the rear surface, so as to enable the light panel to be rotated relative related to related to the base between a lying position and an upright position, and the photographed object is capable of being put on the light transmission cover plate when the light panel is in the lying position.

According to an embodiment of the present invention, the base is pivoted to the side surface or the rear surface via at least a shaft. When the light panel is in the upright position, a first distance from the shaft to a lower side of the light panel is equal to or less than half of a second distance from an upper side of the light panel to the lower side.

According to an embodiment of the present invention, the base is pivoted to the rear surface via at least a shaft, and both of the base and the shaft are not protruding out of the side surface.

According to an embodiment of the present invention, the light panel swapping mechanism between top and side shot photography further comprises at least a supporting leg, wherein the supporting leg is disposed to the side surface or the rear surface, so as to support the light panel in the lying position together with the base. In a specific embodiment of the present invention, the supporting leg can be pivoted to the rear surface via at least a shaft, and both of the supporting leg and the shaft are not protruding out of the side surface. In another specific embodiment of the present invention, the light panel swapping mechanism between top and side shot photography further comprises at least a mechanical linkage connecting the supporting leg and the base, wherein the supporting leg is pivoted to the side surface or the rear surface via at least a shaft, and the base brings the supporting leg to rotate toward the light panel about the shaft via the mechanical linkage when the light panel is rotated from the lying position to the upright position. In some other specific embodiments of the present invention, the mechanical linkage comprises a guiding rail disposed to the side surface or the rear surface, a sliding block glidingly disposed to the guiding rail, a first linkage rod connecting the base and the sliding block, and a second linkage rod connecting the sliding block and the supporting leg. When the light panel is rotated from the lying position to the upright position, the base brings the sliding block to slide along the guiding rail toward the base via the first linkage rod, and the sliding block brings the supporting leg to rotate about the shaft toward the light panel via the second linkage rod.

According to an embodiment of the present invention, the light panel swapping mechanism between top and side shot photography further comprises a motor disposed to the base, a lead screw connecting a shaft of the motor and a threaded sleeve, wherein one end of the threaded sleeve is pivoted to the side surface or the rear surface, and the other end of the threaded sleeve screws onto the lead screw. In a specific embodiment of the present invention, the light panel swapping mechanism between top and side shot photography further comprises a spherical bearing, and the threaded sleeve is pivoted to the side surface or the rear surface via the spherical bearing.

According to an embodiment of the present invention, the light panel swapping mechanism between top and side shot photography further comprises at least one of a pneumatic cylinder and a hydraulic cylinder disposed between the light panel and the base to assist the light panel being rotated between the lying position and the upright position.

According to an embodiment of the present invention, the light panel swapping mechanism between top and side shot photography further comprises at least a lighting device composed of a stand base, a vertical arm disposed on the stand base and a lamp glidingly disposed on the vertical arm to light up the photographed object. In a specific embodiment of the present invention, the stand base comprises a base plate, at least three branches disposed to the base plate and at least three casters respectively disposed to the branches, wherein the vertical arm is disposed on the base plate, and at least one of the branches is retractable or rotatable and the others are fixed. In another specific embodiment of the present invention, the lighting device further comprises a fastener for fixing the lamp on the vertical arm. In yet another specific embodiment of the present invention, the light panel swapping mechanism between top and side shot photography further comprises one or two horizontal arms, wherein when the light panel is in the lying position, each end of the horizontal arm is disposed to a top of the vertical arm, and the photographic device is disposed to the horizontal arm and over the photographed object and the light transmission cover plate. In some other specific embodiments of the present invention, the light panel swapping mechanism between top and side shot photography further comprises a canopy, and a number of the lighting device is two, wherein when the light panel is in the lying position, each end of the canopy is disposed to a top of one of the vertical arms.

According to an embodiment of the present invention, the light panel swapping mechanism between top and side shot photography further comprises a canopy, wherein when the light panel is in the upright position, the canopy is disposed to a top of the light panel.

According to an embodiment of the present invention, the light transmission cover plate is composed of at least one of a translucent plastic plate, a transparent plastic plate, a translucent glass plate and a transparent glass plate.

According to an embodiment of the present invention, the light panel swapping mechanism between top and side shot photography further comprises a stand composed of a stand base, a vertical arm disposed on the stand base and a horizontal arm disposed to the vertical arm, wherein the photographic device is disposed to the horizontal arm and over the photographed object and the light transmission cover plate when the light panel is in the lying position.

Accordingly, the light panel in the present invention is pivoted to the base and thus can be easily swapped between the lying position and the upright position to meet the needs of top shot and side shot photography both. Therefore, it not only has a wide range of uses but also is ease of use and more space saving. Furthermore, it is possible to add a driving mechanism composed of a motor, a lead screw, a threaded sleeve and a spherical bearing to automatically swap the light panel between the lying position and the upright position relative to the base. Besides, it is possible to add a pneumatic cylinder or a hydraulic cylinder to decrease the loading of position swapping.

Moreover, to the light panel in the present invention, its rotation center is located to its midpoint or gravity center, so as to make the rotation easier. In contrast, the rotation center can also be away from the midpoint to let the lower side of the light panel shorter, so as to not only lower the working platform in the lying position but also prevent its lower side hitting the ground or the base during rotation. In addition, the light panel swapping mechanism between top and side shot photography in the present invention can further have at least a supporting leg for supporting the light panel in the lying position together with the base. Similarly, other than the side surface, both of the base and the supporting leg can be pivoted to the rear surface and not protrude out of the side surface as well, so as to keep clear the surroundings of the light panel in the lying position and let the photographed object be put and took more conveniently. Further, the supporting leg can also be connected to the base via a mechanical linkage, so as to be automatically rotated in and out with the rotation of the light panel.

Besides, the light panel swapping mechanism between top and side shot photography in the present invention can further have at least a lighting device for illuminating the shooting surface of the photographed object. Moreover, at least some of the branches of the lighting device is retractable or rotatable, so as to prevent from interfering with the supporting leg and the base when move the lighting device toward and away from the light panel. In addition, in the present invention, the photographic device can be attached to a horizontal arm assembled onto the top end of the vertical arm of the lighting device for top shot photography. Further, other than spanning over the photographed object and the light transmission cover plate when the light panel is in the lying position, the canopy in the present invention can also be disposed on the top of the light panel when the light panel is in the upright position.

BRIEF DESCRIPTION OF THE DRAWINGS

FIG. 6 and FIG. 7 illustrate a schematic structure of a light panel swapping mechanism between top and side shot photography according to yet another embodiment of the present invention, wherein FIG. 6 shows its side shot mode and FIG. 7 its top shot mode.

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations are not described in detail in order not to obscure the present invention. Besides, in all of the following embodiments, the same or similar components illustrated in different embodiments refer to the same symbols.

Figure 1:
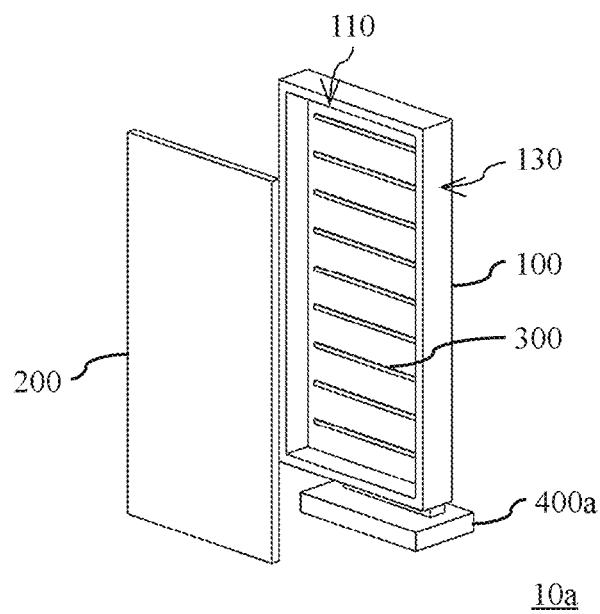
FIG. 1 and FIG. 2 illustrate a schematic structure of a light panel swapping mechanism between top and side shot photography according to an embodiment of the present invention from different angles of view.
Figure 2:
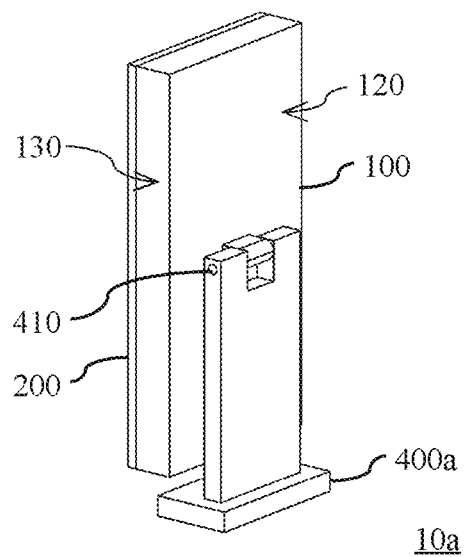
Figure 3:
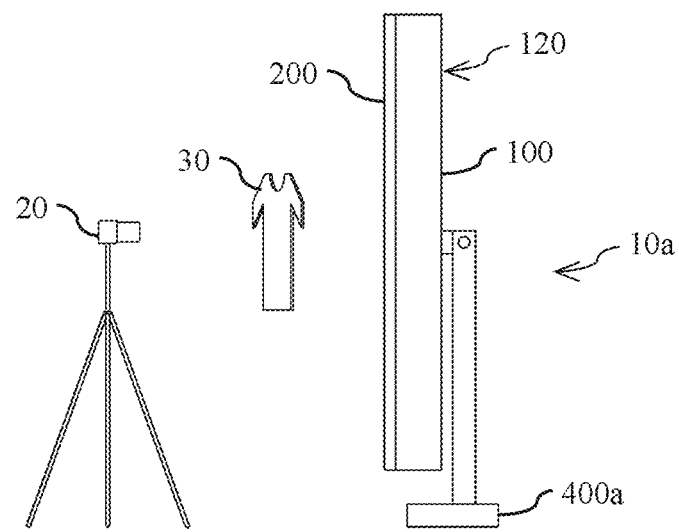
FIG. 3 illustrates a schematic operation in a side shot mode of the light panel swapping mechanism between top and side shot photography as shown in FIG. 1.
Figure 4:
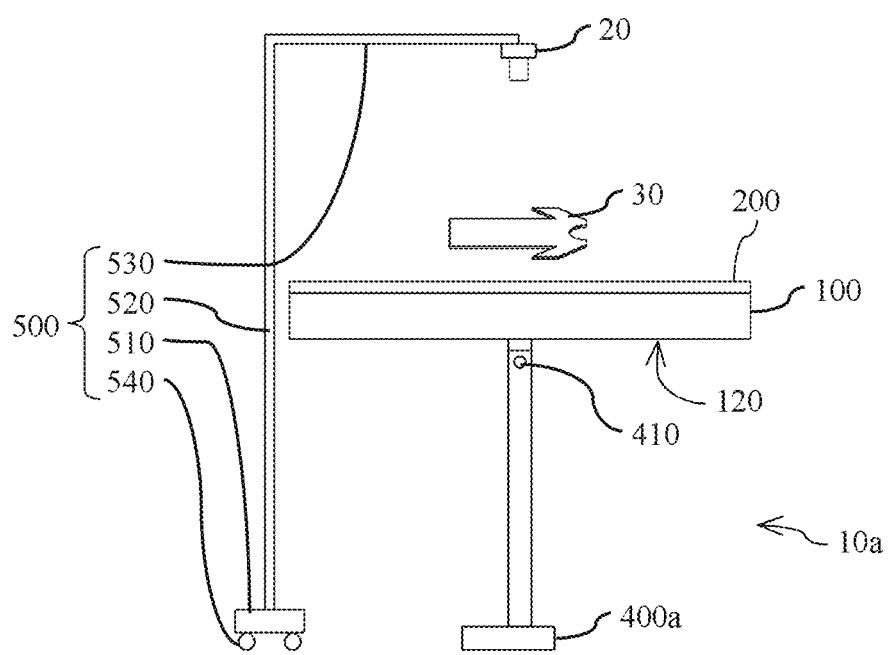
FIG. 4 illustrates a schematic operation in a top shot mode of the light panel swapping mechanism between top and side shot photography as shown in FIG. 1.

FIG. 1 and FIG. 2 illustrate a schematic structure of a light panel swapping mechanism between top and side shot photography according to an embodiment of the present invention from different angles of view. FIG. 3 illustrates a schematic operation in a side shot mode of the light panel swapping mechanism between top and side shot photography as shown in FIG. 1. FIG. 4 illustrates a schematic operation in a top shot mode of the light panel swapping mechanism between top and side shot photography as shown in FIG. 1. Referring to FIG. 1 and FIG. 2 first, the light panel swapping mechanism between top and side shot photography 10a comprises a light panel 100, a light transmission cover plate 200, a light emitting module 300 and a base 400a. The light panel 100 has an opening 110, a rear surface 120 opposite to the opening 110 and a side surface 130 located between the opening 110 and the rear surface 120. The light transmission cover plate 200 covers the opening 110, the light emitting module 300 is disposed in the light panel 100 and the base 400a is pivoted to the rear surface 120.

In the present embodiment, the light emitting module 300 is a bottom lighting backlight module composed of a plurality of LED light strips isometrically arranged right under the light transmission cover plate 200, and the light transmission cover plate 200 can be composed of at least a plate or a sheet made of, for example but not limited to, translucent plastic, transparent plastic, translucent glass or transparent glass. Thus, the light transmission cover plate 200 can be lighted up by the light emitting module 300 to form a uniform pure color surface. In such a case, referring to FIG. 1 and FIG. 3, the light panel 100 can be swapped to an upright position as shown in FIG. 3 for side shot photography, then users can use a photographic device 20 to shoot a photographed object 30 in front of a pure color background provided by the light panel 100.

In contrast, referring to FIG. 1 and FIG. 4, the light panel 100 can also be swapped to a lying position as shown in FIG. 4 for top shot photography, then users can use the photographic device 20 to shoot the photographed object 30 carried on the light transmission cover plate 200 from the top. Similarly, the light transmission cover plate 200 can be lighted up by the light emitting module 300 to form a uniform pure color background under the photographed object 30. Accordingly, the light panel swapping mechanism between top and side shot photography 10a can be applied to both of top and side shot photography for providing a uniform pure color background. It should be noted that the pure color background can be any color by modifying the light emitting module 300. For example, it can be white when the light emitting module 300 using white LED diodes, it can be green when using green LED diodes, and it can be also any color when using all of red, green and blue LED diodes.

Moreover, in other non-illustrated embodiments, the light emitting module can further include at least an optical film, such as a diffuser, a brightness enhancement film and a reflector. The optical films can not only improve the luminous efficiency and the uniformity of the LED strips, but also effectively reduce the overall thickness of the light panel. In addition, in other non-illustrated embodiments, the above-mentioned LED strips can be replaced by a plurality of LED light tubes, a plurality of fluorescent light tubes, a LED array light panel, a mini LED array light panel, a LED panel light or any other commercially available light source, and the bottom lighting backlight module in the present embodiment can also be replaced by an edge-lit backlight module.

Referring to FIG. 4, in the present embodiment, the light panel swapping mechanism between top and side shot photography 10a can further include a stand 500 composed of a stand base 510, a vertical arm 520 and a horizontal arm 530. The vertical arm 520 can be disposed on the stand base 510, the horizontal arm 530 can be extended from the top of the vertical arm 520 and spanning over the photographed object 30 and the light transmission cover plate 200, and the photographic device 20 can be disposed on the horizontal arm 530. Accordingly, the photographic device 20 can be hung over the photographed object 30 and the light transmission cover plate 200 by the stand 500 for top shot photography when the light panel 100 is in the lying position. Further, the stand 500 can further comprises a plurality of casters 540 disposed under the stand base 510 for ease of move.

Figure 5:
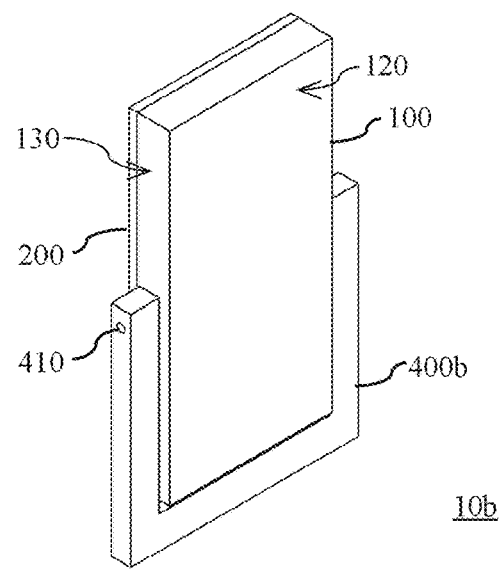
FIG. 5 illustrates a schematic structure of a light panel swapping mechanism between top and side shot photography according to another embodiment of the present invention.

FIG. 5 illustrates a schematic structure of a light panel swapping mechanism between top and side shot photography according to another embodiment of the present invention. In the previous embodiment as shown in FIG. 2 and FIG. 4, the base 400a is pivoted to the rear surface 120 of the light panel 100 via a shaft 410, and both of the base 400a and the shaft 410 are not protruding out of the left and right side of the light panel 100. Therefore, in the present embodiment, there is nothing on around the light panel 100 so that the photographed object 30 is easy to put and take when the light panel 100 is in the lying position. In contrast, referring to the light panel swapping mechanism between top and side shot photography 10a as shown in FIG. 5, the base 400a is formed as a U-shape and pivoted to two opposite side surfaces 130 of the light panel 100 via two shafts 410 so that the rear surface 120 can be fully flat onto the wall and save more space when the light panel 100 is in the upright position.

Moreover, referring to FIG. 2 and FIG. 5, in these two embodiments, the shafts 410 are pivoted to half high of the light panel 100 in the upright position. Therefore, the bases 400a, 400b can stably support to the center of the light panel 100 without any further supporting leg when the light panel 100 is swapped to the lying position. In such an instance, the height of the light panel 100 in the upright position can be increased for shooting a higher photographed object, and the height of the bases 400a, 400b and the light panel 100 in the lying position will be increased accordingly. It should be noted that with the height increasing of the bases 400a, 400b and the light panel 100 in the lying position, the light transmission cover plate 200 may be too high and inconvenient to put and take the photographed object. Hence, in some other embodiments of the present invention, a distance between the shaft and the lower side of the light panel in the upright position can be shorter than the half high of the light panel 100 in the upright position. In such a case, it is necessary to have a proper counterweighting to let the gravity center of the light panel always fall on the base during the light panel swapped between the lying and upright positions, or otherwise add at least an additional supporting leg to provide a stable support together with the base for the light panel in the lying position.

Figure 6:
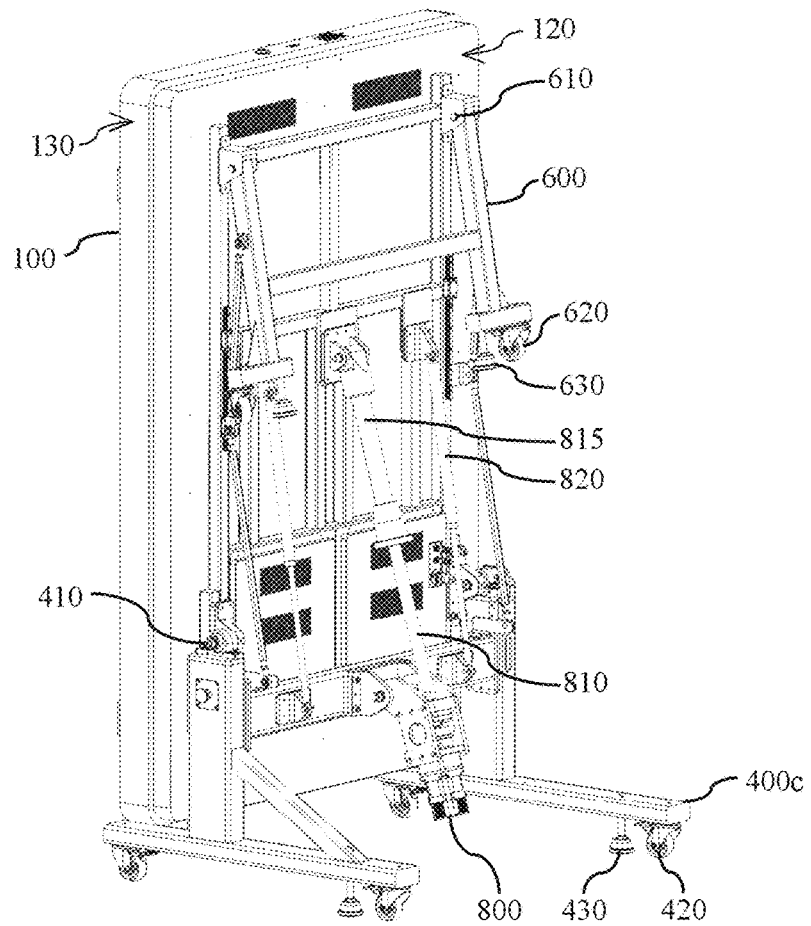
Figure 7:
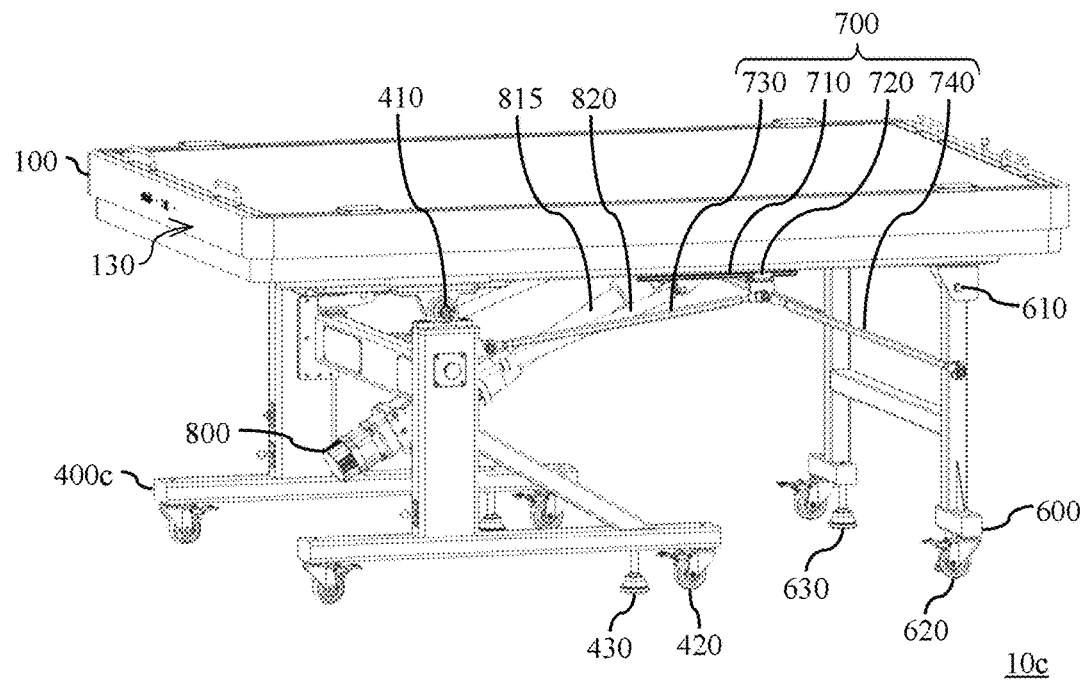

FIG. 6 and FIG. 7 illustrate a schematic structure of a light panel swapping mechanism between top and side shot photography according to yet another embodiment of the present invention, wherein FIG. 6 shows its side shot mode and FIG. 7 its top shot mode. To the light panel swapping mechanism between top and side shot photography 10c as shown in FIG. 6 and FIG. 7, the distance between the shaft 410 and the lower side of the light panel 100 is smaller than the half high of the light panel 100 in the upright position so that it would be more suitable for a higher light panel 100 than the previous embodiments as shown in FIGS. 1-4. In detail, to the embodiments as shown in FIGS. 1-4, the high of the shaft 410 must be higher than 90 cm when the height of the light panel 100 in the upright position is taller than 180 cm, or the lower side of the light panel 100 will hit the ground during being swapped from the lying position to the upright position. In such a case, the top surface of the light transmission cover plate 200 must be higher than 90 cm and causes the photographed object 30 inconvenient to be put onto and took from the light transmission cover plate 200. In contrast, to the embodiment as shown in FIG. 6 and FIG. 7, the top surface of the light transmission cover plate 200 can be always at a proper height from 75 to 95 cm for ease of users to put and take the photographed object 30, even the height of the light panel 100 in the upright position as shown in FIG. 7 is already taller than 220 cm.

Moreover, the light panel swapping mechanism between top and side shot photography 10c in the present embodiment can also include a supporting leg 600 with a H-shaped, so as to provide a stable support together with the base 400c for the light panel 100 in the lying position as shown in FIG. 7. In such an instance, the base 400c can be pivoted to the rear surface 120 of the light panel 100 via two shafts 410, the supporting leg 600 can also be pivoted to the rear surface 120 of the light panel 100 via two shafts 610, and all of the base 400c, the shafts 410, the supporting leg 600 and the shafts 610 are not protruding out of the side surface 130 of the light panel 100 for ease of users to put and take the photographed object (not shown). Besides, in the present embodiment, the base 400c and the supporting leg 600 can respectively have a plurality of casters 420, 620 to freely roll the whole system and a plurality of leveling feet 430, 630 to hold the whole system in position and level it. However, in some other non-illustrated embodiments, the supporting leg can also be pivoted to the side surface of the light panel via two shafts, or otherwise the number of the supporting leg can be two and respectively pivoted to the rear surface or the side surface of the light panel via a shaft.

Besides, the light panel swapping mechanism between top and side shot photography 10c in the present embodiment can also include two mechanical linkages 700 connecting from the base 400c to both sides of the supporting leg 600. Each of the mechanical linkages 700 can comprise a guiding rail 710, a sliding block 720 and two linkage rods 730, 740, wherein the guiding rail 710 is disposed to the rear surface 120 of the light panel 100, while the sliding block 720 is glidingly disposed to the guiding rail 710 and connects with the base 400c and the supporting leg 600 via the linkage rods 730, 740. Thus, when the light panel 100 is swapped from the lying position as shown in FIG. 7 to the upright position as shown in FIG. 6, the base 400c brings the sliding block 720 to move along the guiding rail 710 toward the base 400c via the linkage rod 730, so as to enable the sliding block 720 brings the supporting leg 600 to rotate about the shaft 610 toward the rear surface 120 of the light panel 100 via the linkage rod 740. Similarly, as the light panel 100 is swapped from the upright position as shown in FIG. 6 to the lying position as shown in FIG. 7, the base 400c brings the supporting leg 600 to rotate about the shafts 610 away from the rear surface 120 of the light panel 100 via the mechanical linkage 700. However, in some other non-illustrated embodiments, the guiding rail can be disposed to the side surface of the light panel.

In the present embodiment, the light panel swapping mechanism between top and side shot photography 10c can further include a motor 800, a lead screw 810, a threaded sleeve 815 and at least a pneumatic cylinder 820 (or a hydraulic cylinder). Herein, the motor 800 can be disposed to the base 400c, and its shaft can connect with the lead screw 810. One end of the threaded sleeve 815 can be pivoted to the rear surface 120 of the light panel 100, and the other end of the threaded sleeve 815 can be screwed onto the lead screw 810. Therefore, the light panel 100 can be swapped between the upright and lying positions by using the motor to drive the lead screw 810 screwing into or out of the threaded sleeve 815. Moreover, the pneumatic cylinder 820 can be disposed between the rear surface 120 of the light panel 100 and the base 400c to assist the light panel 100 being swapped between the upright position as shown in FIG. 6 and the lying position as shown in FIG. 7.

Figure 13:
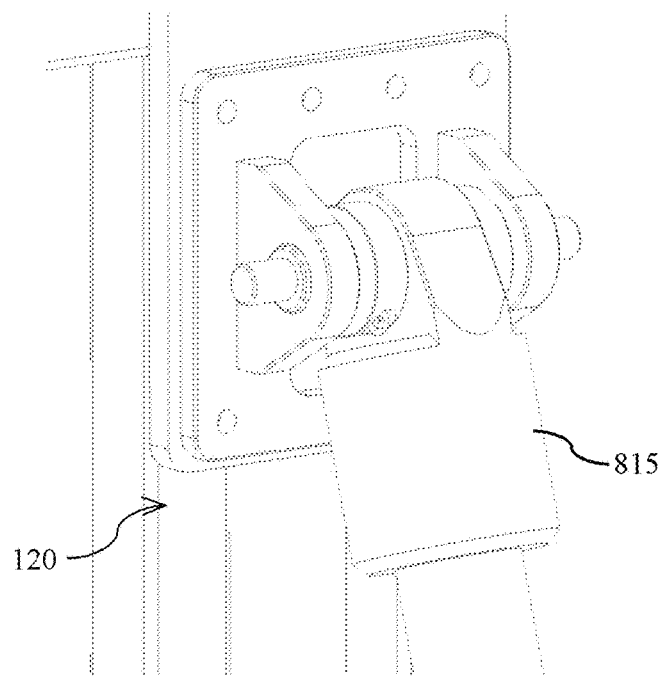
FIG. 13 illustrate a partial schematic structure of FIG. 7 to show the threaded sleeve pivoted to the rear surface of the light panel via the spherical bearing in detail.
Figure 14:
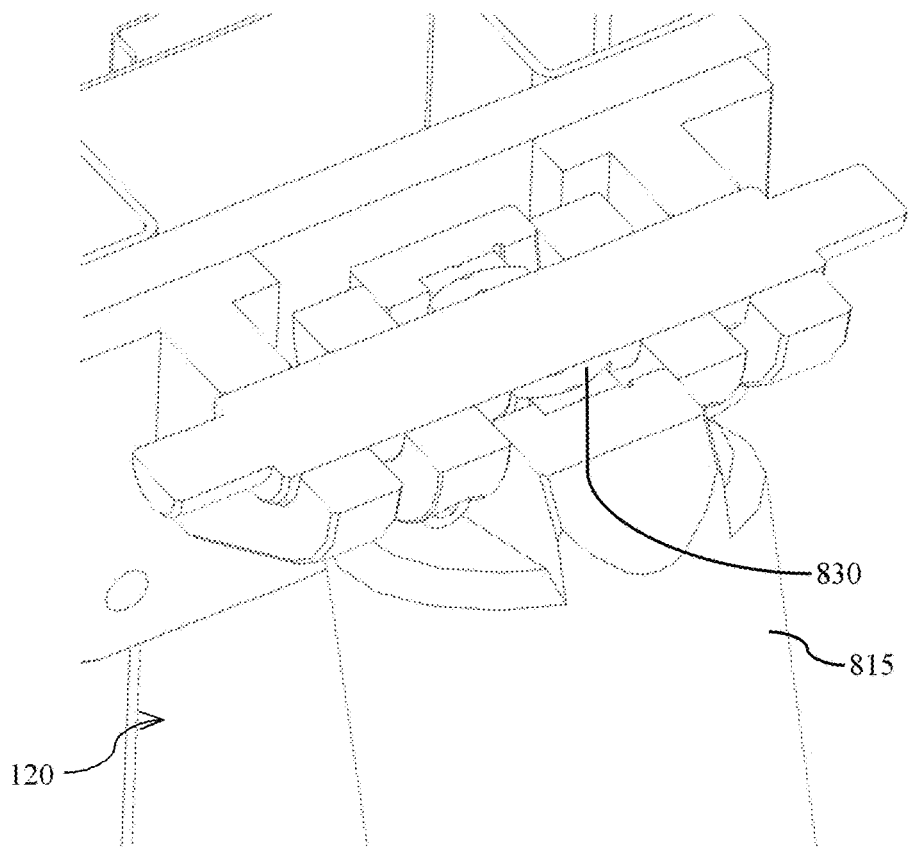
FIG. 14 illustrate a cross-sectional view of the threaded sleeve and the spherical bearing along the shaft as shown in FIG. 13.

FIG. 13 illustrate a partial schematic structure of FIG. 7 to show the threaded sleeve pivoted to the rear surface of the light panel via the spherical bearing in detail, while FIG. 14 illustrate a cross-sectional view of the threaded sleeve and the spherical bearing along the shaft as shown in FIG. 13. Referring to FIG. 6, it should be noted that not only the thread clearances between the lead screw 810 and the threaded sleeve 815 but also the angle between the threaded sleeve 815 and the light panel 100 are constantly changing during the motor 800 drives the lead screw 810 screwing into or out of the threaded sleeve 815. That may cause some unwanted vibrations from the junctions between the lead screw 810, the threaded sleeve 815 and the light panel 100. Therefore, referring to FIG. 13 and FIG. 14, the threaded sleeve 815 can be pivoted to the rear surface 120 of the light panel 100 indirectly via a spherical bearing 830 for absorbing those unwanted vibrations. In some other non-illustrated embodiments, the threaded sleeve can be pivoted to the side surface of the light panel as well. Similarly, the pneumatic cylinder can also be disposed between the side surface of the light panel and the base.

Figure 8:
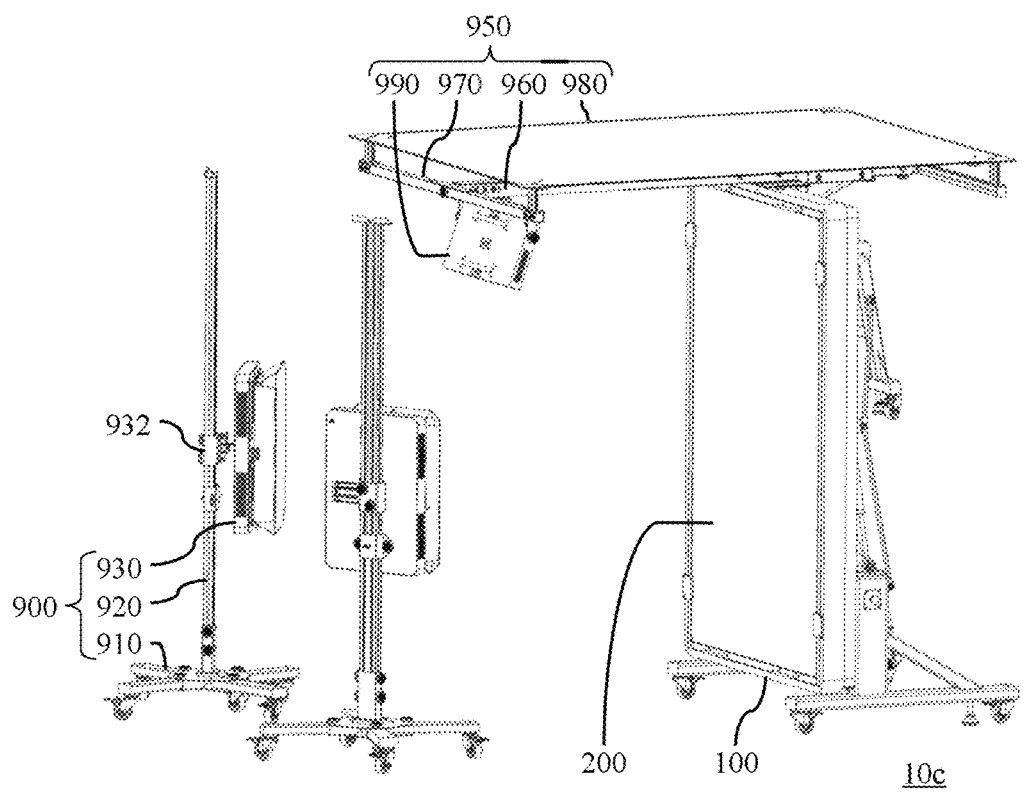
FIG. 8 illustrates a schematic structure of the light panel swapping mechanism between top and side shot photography as shown in FIG. 6 additionally adding two lighting devices and a canopy.
Figure 9:
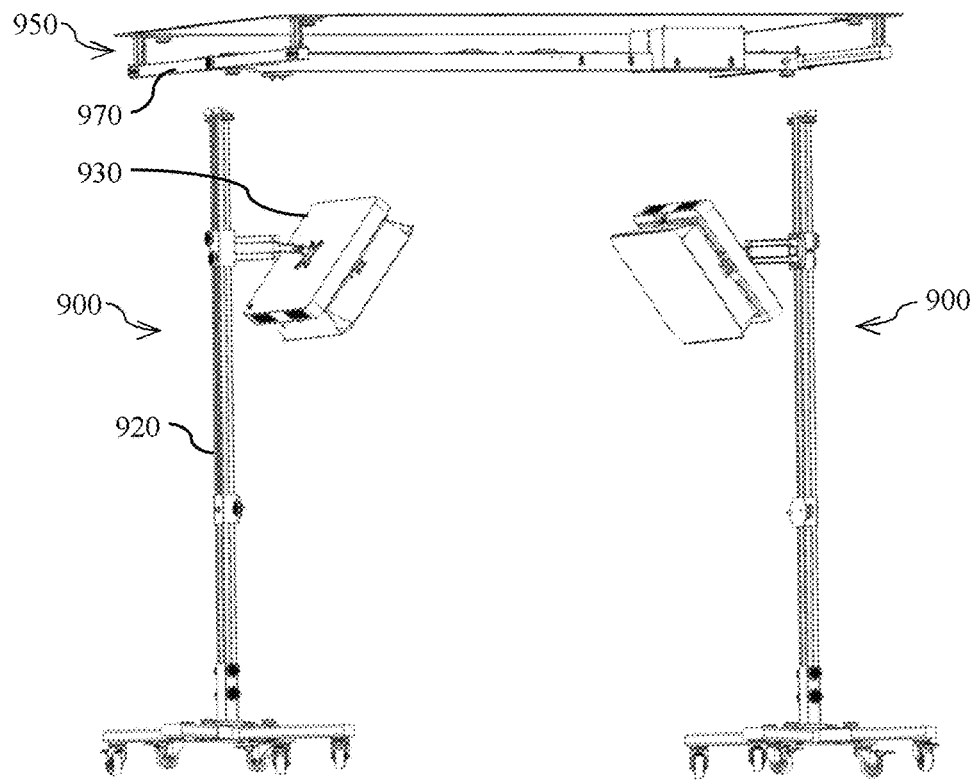
FIG. 9 illustrates a schematic view to assemble the lighting devices and the canopy as shown in FIG. 8 together.
Figure 10:
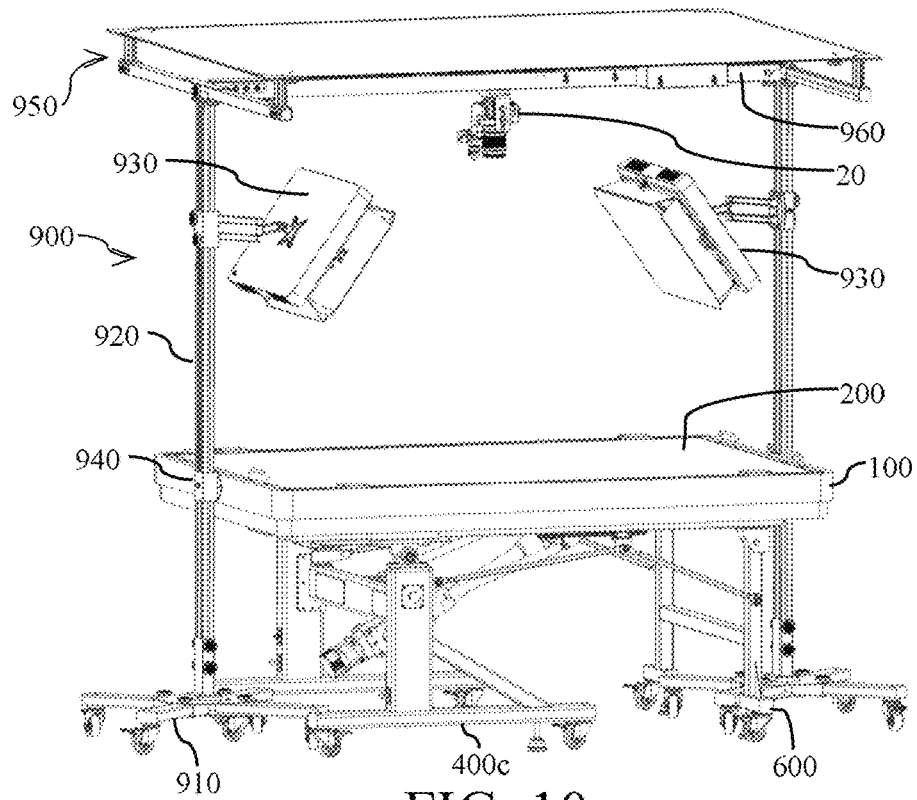
FIG. 10 illustrates a schematic structure of the light panel swapping mechanism between top and side shot photography as shown in FIG. 7 additionally adding the assembly as shown in FIG. 9.

FIG. 8 illustrates a schematic structure of the light panel swapping mechanism between top and side shot photography as shown in FIG. 6 additionally adding two lighting devices and a canopy. FIG. 9 illustrates a schematic view to assemble the lighting devices and the canopy as shown in FIG. 8 together. FIG. 10 illustrates a schematic structure of the light panel swapping mechanism between top and side shot photography as shown in FIG. 7 additionally adding the assembly as shown in FIG. 9. Referring to FIG. 8 first, in the present embodiment, the light panel swapping mechanism between top and side shot photography 10c can further include at least a lighting device 900 (there are two lighting devices 900 shown in the present embodiment) and a canopy 950. Herein, each of the lighting device 900 can be composed of a stand base 910, a vertical arm 920 disposed on the stand base 910 and a lamp 930 glidingly disposed to the vertical arm 920, and the canopy 950 can be composed of a horizontal arm 960, two frames 970 respectively disposed to one end of the horizontal arm 960 and a cover 980 supported by the frames 970.

As shown in FIG. 8, for the side shot photography, users can move each lighting device 900 to the front left or front right side of the light panel 100, slide its lamp 930 up or down to a specific height as needed, and then use a fastener 932 to fix the lamp 930 on the vertical arm 920, so as to light up the photographed object (not shown) in front of the light transmission cover plate 200 from different directions. In the present embodiment, the fastener 932 can be composed of at least one of a screw, a nut, a lever, a spring washer and a flat washer. Further, the canopy 950 can be disposed to the top of the light panel 100 in the upright position to block the ambient light over the canopy 950. In addition, the canopy 950 in the present embodiment can further include a top light 990 disposed to the horizontal arm 960 to light up the photographed object (not shown) from its top.

To swap the light panel swapping mechanism between top and side shot photography 10c from the lying position as shown in FIG. 8 into the upright position as shown in FIG. 10, users can sequentially remove the top light 990 and the canopy 950 from the light panel 100 first. Thereafter, referring to FIG. 9, use the two lighting devices 900 to support the canopy 950 by connect the two frames 970 onto the tops of the two vertical arms 920, and respectively adjust the lamps 930 to a proper height. After that, referring to FIG. 10, use two connecting pieces 940 to fix the vertical arms 920 to two opposite sides of the light panel 100 in the lying position. Thus, users can use not only the two lamps 930 to light up the photographed object (not shown) on the light transmission cover plate 200 from its top left and top right sides, but also the canopy 950 to block the ambient light over the canopy 950. Further, it is also possible to hang the photographic device 20 by the horizontal arm 960 over the photographed object (not shown) on the light transmission cover plate 200 for top shot photography.

It should be noted that the pass way between the two stand bases 910 in some specific embodiment is possibly not large enough like FIG. 10 so that the light panel 100 may be unable to be moved in-between the two lighting devices 900 due to the interference formed between the stand bases 910 and the base 400c or the supporting leg 600. Thus, the stand base 910 in the present embodiment can further include a retractable or rotatable mechanism to enlarge the pass way between the two stand bases 910.

Figure 11:
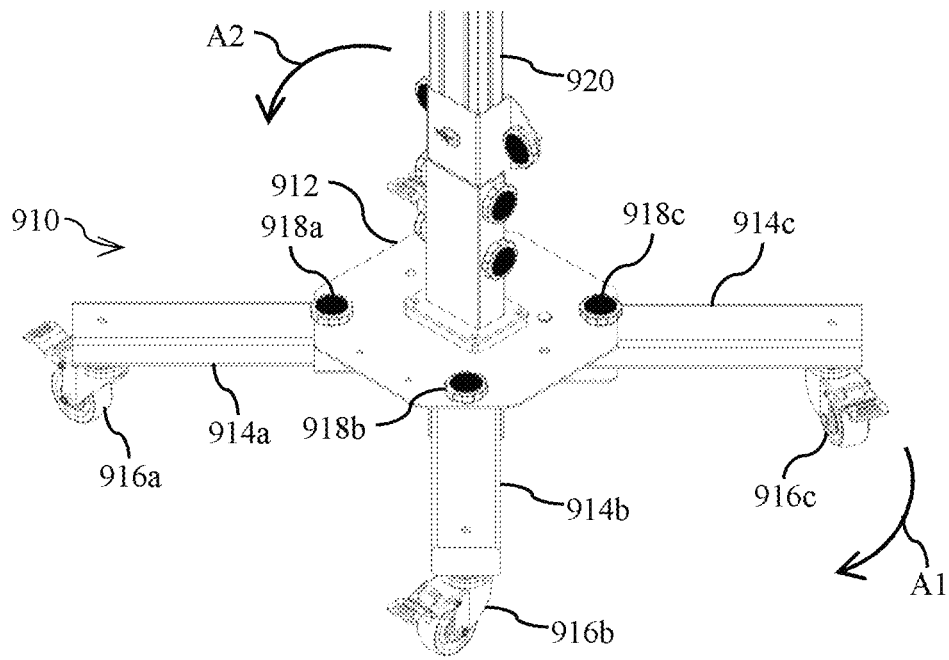
FIG. 11 and FIG. 12 illustrate the steps to adjust the branches of the stand base as shown in FIG. 8.
Figure 12:
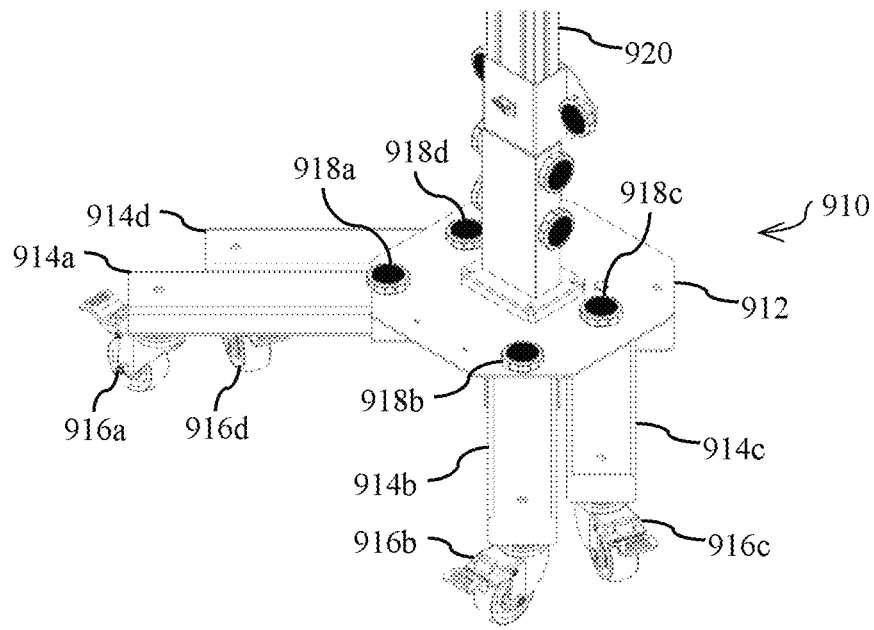

FIG. 11 and FIG. 12 illustrate the steps to adjust the branches of the stand base as shown in FIG. 8. Referring to FIG. 11 and FIG. 12, the stand base 910 in the present embodiment is composed of a base plate 912, at least three branches (there are four branches 914a, 914b, 914c, 914d shown in the present embodiment) and at least three casters (there are four casters 916a, 916b, 916c, 916d shown in the present embodiment). Herein, the vertical arm 920 is disposed to the base plate 912, the branches 914a, 914b, 914c, 914d are respectively locked on the base plate 912 via the hand screws 918a, 918b, 918c, 918d, and the casters 916a, 916b, 916c, 916d are respectively disposed to the bottoms of the branches 914a, 914b, 914c, 914d.

It should be noted that users can remove the hand screws 918c, 918d, rotate the branches 914c, 914d toward the branches 914b, 914a along the directions of the arrows A1 and A2, and use the hand screws 918c, 918d to lock the branches 914c, 914d in position as shown in FIG. 11. As a result, users can easily move the base 400c and the supporting leg 600 in-between the two stand bases 910 without any interference from the branches 914c, 914d. However, in some other non-illustrated embodiments, the rotatable branches as shown in FIG. 11 and FIG. 12 can also be replaced by retractable branches or slidable branches to enable the branches and the casters to be moved to under the base plate.

Furthermore, referring to FIG. 10 again, in some specific embodiments, user can also remove one of the lighting devices 900 and hang the photographic device 20 by the horizontal arm 960 over the photographed object (not shown) on the light transmission cover plate 200 for top shot photography. In a word, the stand 500 as shown in FIG. 4 can also be replaced by a combination of a stand base 910, a vertical arm 920 and a horizontal arm 960 as shown in FIG. 10 if necessary.

In summary, the light panel in the present invention can be easily swapped between the lying position and the upright position to meet the needs of top shot and side shot photography. Besides, the light panel position swapping can be achieved by hand or automatically by using a motor, a lead screw, a threaded sleeve and a spherical bearing, and an additional pneumatic or hydraulic cylinder can also be used for labor-saving.

Moreover, the rotation center of the light panel can be not only located to the midpoint or gravity center, but also away from the midpoint when there is at least a supporting leg. In addition, the base and the supporting leg can be not only pivoted to the side surface, but also pivoted to the rear surface and not protruding out of the side surface. Besides, it is possible to add a mechanical linkage between the supporting leg and the base to hand freely extend or retract the supporting leg along with the light panel position swapping.

Further, the present invention can further comprise at least a lighting device to light up the photographed object. The branches of the lighting device can be retractable or rotatable to prevent any interference with the supporting leg and the base. To the top shot photography, the photographic device can be hung by an additional horizontal arm attached to the top of the vertical arm of the lighting device. The present invention can further comprise a canopy, it can be not only supported by two lighting devices to span over the photographed object put on the light transmission cover plate when the light panel is in the lying position, but also disposed to the top of the light panel when the light panel is in the upright position.

What is claimed is:

1. A light panel swapping mechanism between top and side shot photography, capable of providing a pure color background for a photographed object captured by a photographic device and comprising:

a light panel; having an opening facing toward the photographic device and the photographed object, a rear surface opposite to the opening and a side surface located between the opening and the rear surface;

a light transmission cover plate, covering the opening;

a light emitting module, disposed in the light panel and capable of evenly lighting up the light transmission cover plate;

a base, pivoted to the side surface or the rear surface, so as to enable the light panel to be rotated relative to the base between a lying position and an upright position, wherein the photographed object is capable of being put on the light transmission cover plate when the light panel is in the lying position;

at least a supporting leg, pivoted to the side surface or the rear surface via at least a shaft, so as to support the light panel in the lying position together with the base; and at least a mechanical linkage connecting the supporting leg and the base, wherein the base brings the supporting leg to rotate toward the light panel about the shaft via the mechanical linkage when the light panel is rotated from the lying position to the upright position.

2. The light panel swapping mechanism between top and side shot photography as claimed in claim 1, wherein the base is pivoted to the rear surface via at least a shaft, and when the light panel is in the upright position, a first distance from the shaft to a lower side of the light panel is equal to or less than half of a second distance from an upper side of the light panel to the lower side.

3. The light panel swapping mechanism between top and side shot photography as claimed in claim 1, wherein the base is pivoted to the side surface via at least a shaft, and when the light panel is in the upright position, a first distance from the shaft to a lower side of the light panel is equal to or less than half of a second distance from an upper side of the light panel to the lower side.

4. The light panel swapping mechanism between top and side shot photography as claimed in claim 1, wherein the base is pivoted to the rear surface via at least a shaft, and both of the base and the shaft are not protruding out of the side surface.

5. The light panel swapping mechanism between top and side shot photography as claimed in claim 1, wherein both of the supporting leg and the shaft are not protruding out of the side surface.

6. The light panel swapping mechanism between top and side shot photography as claimed in claim 1, wherein the mechanical linkage comprises:
a guiding rail, disposed to the side surface or the rear surface;
a sliding block, glidingly disposed to the guiding rail;
a first linkage rod, connecting the base and the sliding block; and
a second linkage rod, connecting the sliding block and the supporting leg, wherein when the light panel is rotated from the lying position to the upright position, the base brings the sliding block to slide along the guiding rail toward the base via the first linkage rod, and the sliding block brings the supporting leg to rotate about the shaft toward the light panel via the second linkage rod.

7. The light panel swapping mechanism between top and side shot photography as claimed in claim 1, further comprising:
a motor, disposed to the base;
a lead screw, connecting a shaft of the motor; and
a threaded sleeve, wherein one end of the threaded sleeve is pivoted to the side surface or the rear surface, and the other end of the threaded sleeve screws onto the lead screw.

8. The light panel swapping mechanism between top and side shot photography as claimed in claim 7, further comprising a spherical bearing, wherein the threaded sleeve is pivoted to the side surface or the rear surface via the spherical bearing.

9. The light panel swapping mechanism between top and side shot photography as claimed in claim 1, further comprising at least one of a pneumatic cylinder and a hydraulic cylinder disposed between the light panel and the base to assist the light panel being rotated between the lying position and the upright position.

10. The light panel swapping mechanism between top and side shot photography as claimed in claim 1, further comprising at least a lighting device, wherein the lighting device comprises:
a stand base;
a vertical arm, disposed on the stand base; and
a lamp, glidingly disposed on the vertical arm for lighting up the photographed object.

11. The light panel swapping mechanism between top and side shot photography as claimed in claim 10, wherein the stand base comprises:
a base plate, wherein the vertical arm is disposed on the base plate;
at least three branches, disposed to the base plate, wherein at least one of the branches is retractable or rotatable and the others are fixed; and
at least three casters, respectively disposed to the branches.

12. The light panel swapping mechanism between top and side shot photography as claimed in claim 10, further comprising a connecting piece, wherein when the light panel is in the lying position, the connecting piece connects the vertical arm to the side surface.

13. The light panel swapping mechanism between top and side shot photography as claimed in claim 10, further comprising a horizontal arm, wherein when the light panel is in the lying position, the horizontal arm is disposed to a top of the vertical arm, and the photographic device is disposed to the horizontal arm and over the photographed object and the light transmission cover plate.

14. The light panel swapping mechanism between top and side shot photography as claimed in claim 10, further comprising a horizontal arm, and a number of the lighting device is two, wherein when the light panel is in the lying position, each end of the horizontal arm is disposed to a top of one of the vertical arms, and the photographic device is disposed to the horizontal arm and over the photographed object and the light transmission cover plate.

15. The light panel swapping mechanism between top and side shot photography as claimed in claim 10, further comprising a canopy, and a number of the lighting device is two, wherein when the light panel is in the lying position, each end of the canopy is disposed to a top of one of the vertical arms.

16. The light panel swapping mechanism between top and side shot photography as claimed in claim 1, further comprising a canopy, wherein when the light panel is in the upright position, the canopy is disposed to a top of the light panel.

17. The light panel swapping mechanism between top and side shot photography as claimed in claim 1, wherein the light transmission cover plate is composed of at least one of a translucent plastic plate, a transparent plastic plate, a translucent glass plate and a transparent glass plate.

18. The light panel swapping mechanism between top and side shot photography as claimed in claim 1, further comprising a stand, wherein the stand comprises:
a stand base;
a vertical arm, disposed on the stand base; and
a horizontal arm, disposed to the vertical arm, wherein the photographic device is disposed to the horizontal arm and over the photographed object and the light transmission cover plate when the light panel is in the lying position.

* * * * *